United States Patent
Anderson

(10) Patent No.: US 9,469,472 B2
(45) Date of Patent: Oct. 18, 2016

(54) PARTICULATE DISAGGREGATING METHOD AND APPARATUS

(71) Applicant: Michael L. Anderson, Newark, OH (US)

(72) Inventor: Michael L. Anderson, Newark, OH (US)

(*) Notice: Subject to any disclaimer, the term of this patent is extended or adjusted under 35 U.S.C. 154(b) by 494 days.

(21) Appl. No.: 14/082,770

(22) Filed: Nov. 18, 2013

(65) Prior Publication Data

US 2014/0138463 A1 May 22, 2014

Related U.S. Application Data

(60) Provisional application No. 61/727,811, filed on Nov. 19, 2012.

(51) Int. Cl.
| | |
|---|---|
| *B02C 19/22* | (2006.01) |
| *B65D 88/66* | (2006.01) |
| *B65D 88/68* | (2006.01) |

(52) U.S. Cl.
CPC ............... *B65D 88/66* (2013.01); *B02C 19/22* (2013.01); *B65D 88/68* (2013.01)

(58) Field of Classification Search
CPC ........ B65D 88/66; B65D 88/68; B02C 19/22

USPC .................................................... 241/260.1
See application file for complete search history.

(56) References Cited

U.S. PATENT DOCUMENTS

| | | | |
|---|---|---|---|
| 4,207,005 | A | 6/1980 | Stanfield |
| 5,074,478 | A | 12/1991 | Fujiwara et al. |
| 2010/0149904 | A1 | 6/2010 | Ohi et al. |

FOREIGN PATENT DOCUMENTS

EP       0339785       11/1989

*Primary Examiner* — Mark Rosenbaum
(74) *Attorney, Agent, or Firm* — Jason H. Foster; Kremblas & Foster

(57) ABSTRACT

A method and means for disaggregating aggregated particulate. A housing contains a rotational motor and a vibrating motor also has an auger drivingly linked to the rotational motor. Legs extend from the housing in the same direction as the auger and the device rests upon the aggregated particulate. Upon driving the rotational motor, the auger bores through the aggregated particulate, thereby disaggregating particulate. The vibrating motor is also driven to vibrate and further disaggregate the particulate. A plate device with a vibrating motor attached is also used to disaggregate the particulate, such as by teeth extending from the bottom of the plate that are driven into the aggregate by the weight of the plate when vibrated.

7 Claims, 9 Drawing Sheets

PARTICULATE DISAGGREGATING METHOD AND APPARATUS

CROSS-REFERENCES TO RELATED APPLICATIONS

This application claims the benefit of U.S. Provisional Application No. 61/727,811 filed Nov. 19, 2012, which priority application is incorporated herein by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to devices for disaggregating particulate matter that has aggregated together, and more particularly to a vibratory and auger apparatus for breaking up clumps of particulate matter.

It is common for particulate matter, such as sugar, sand or grain, to cohere during storage and form hard clumps. Cohesion can occur due to changes or extremes in humidity, temperature and pressure, along with other parameters. Aggregated clumps can be spherically or oddly shaped, but also can form along planes or curves, such as the upper layer of a large mound of sugar. When a curved clump forms from one side to the other of a container of particulate, such as a sugar silo, this clump is referred to as a "bridge". A bridge is hardened, aggregated particulate that substantially blocks the flow of disaggregated, fluent particulate that is above the bridge, if any, downward toward the outlet of the silo.

Bridging in sugar silos creates significant risk of human injury or death and substantial cost, because when a sugar silo has significant bridging, measures must be taken to break through the bridge. To begin with, production must be reduced or shut down, which incurs lost production costs. Furthermore, the silo must be at least partially emptied, which results in lost sugar, because the removed sugar must be discarded. Still further, a human, such as an experienced contractor or employee who is experiences with the equipment, must then break the bridging material apart so that it flows and can be used.

Typical procedures for breaking the bridged particulate involve manually poking the bridge from beneath with a long pole in an attempt to mechanically break the bridge. However, this must be done without being harmed by collapsing of the bridged material. Another procedure involves lowering a person onto the bridged particulate from above and using similar tools in an attempt to break down the aggregated material. Although the person is tethered when lowered into the silo, this is still a dangerous procedure. Still further, it is known to contact the bridged particulate from above with a long tool that rotates in order to "drill" through the bridged particulate. A bit is used to penetrate the bridged particulate, and if the bit does not penetrate far enough, another bit is attached in series with the first in order to penetrate farther into the bridged particulate.

All conventional procedures for breaking through a bridge create a substantial risk of injury or death due to the possibility that the sought-after collapse of the bridging material will harm a person in close proximity. Alternatively, even without injury or death, contamination of the particulate material is likely, particularly when a person is lowered into the silo.

The need exists for a method and means for breaking down bridging particulate without the risks of injury, death and contamination that accompany conventional methods and means.

BRIEF SUMMARY OF THE INVENTION

The need is met by a boring and disaggregating apparatus that comprises a housing to which a controlled vibrating motor is rigidly mounted, and to which a rotational motor is rigidly mounted, wherein the rotational motor has a driveshaft. It should be noted that a "vibrating" motor is not necessarily a motor that is vibrating currently, but one that is capable of vibrating or vibrating currently.

An auger is drivingly linked to the motor's driveshaft to rotate relative to the housing, and the auger extends from the housing in a first direction, which can include downward. At least one leg extends from the housing, and the at least one leg has a component in the first direction. In a preferred embodiment, the at least one leg includes at least three legs, each of which is substantially parallel to one another and substantially parallel to an axis of rotation of the auger. In a particularly preferred embodiment, the auger is conically shaped and has at least one helical flight thereupon for engaging aggregated particulate and disaggregating the same upon rotation of the auger.

The need is also met by a disaggregating device that comprises a rigid plate, which can be rectangular, and at least one tooth extending substantially perpendicularly from the plate. In a preferred embodiment, the at least one tooth includes at least four teeth in two substantially parallel rows. Each of the teeth preferably has a base attached to the plate and a tip spaced from the plate that is substantially narrower than the base. A vibratory motor rigidly is mounted to the plate.

The need is also met by a combination of a boring and disaggregating apparatus and an aggregate layer, the combination comprises a housing to which a vibrating motor is rigidly mounted. A rotational motor is rigidly mounted to the housing, and the rotational motor has a driveshaft. An auger is drivingly linked to the motor's driveshaft to rotate relative to the housing, and the auger extends from the housing in a first direction and contacts the aggregate at an auger tip. At least one leg extends from the housing, and said at least one leg has a component in the first direction and a leg tip contacting the aggregate. In a preferred embodiment, a second leg and a third leg extend from the housing substantially parallel to the first leg, and each of the second and third legs has a leg tip contacting the aggregate. In a particularly preferred embodiment, the auger contacts the aggregate within a bore formed in the aggregate.

The need is also met by a method of boring and disaggregating an aggregate layer, the method comprising disposing a housing above the aggregate layer. The housing has a rotational motor rigidly mounted to the housing, wherein the rotational motor has a driveshaft. A vibrating motor is rigidly mounted to the housing, and an auger is drivingly linked to the motor's driveshaft. The auger extends from the housing in a first direction and at least one leg extends from the housing. Said at least one leg has a component in the first direction and a leg tip contacting the aggregate. The aggregate at an auger tip is contacted by the aggregate, and the auger is rotated relative to the housing and said at least one leg by driving the rotational motor. This action of rotating the auger thereby disaggregates particulate at least near the auger tip. The housing, said at least one leg, and the auger are vibrated by driving the vibrating motor. In a preferred embodiment, the steps of rotating the auger and vibrating by driving the vibrating motor are repeated until the aggregate layer has been penetrated.

The invention described herein is used to penetrate bridges in sugar storage tanks, and could be used (or adapted to be used) to penetrate bridges in containers of any particulate material. Two devices are described and shown below, each of which is used in a process described that is also unique. It is preferred to use the devices in sequence, because the second device is advantageous after the first device has loosened some of the hardened particulate at the surface. The second device will more readily "dig" into the hardened particulate beneath the loosened particulate on the surface.

Figure 1:
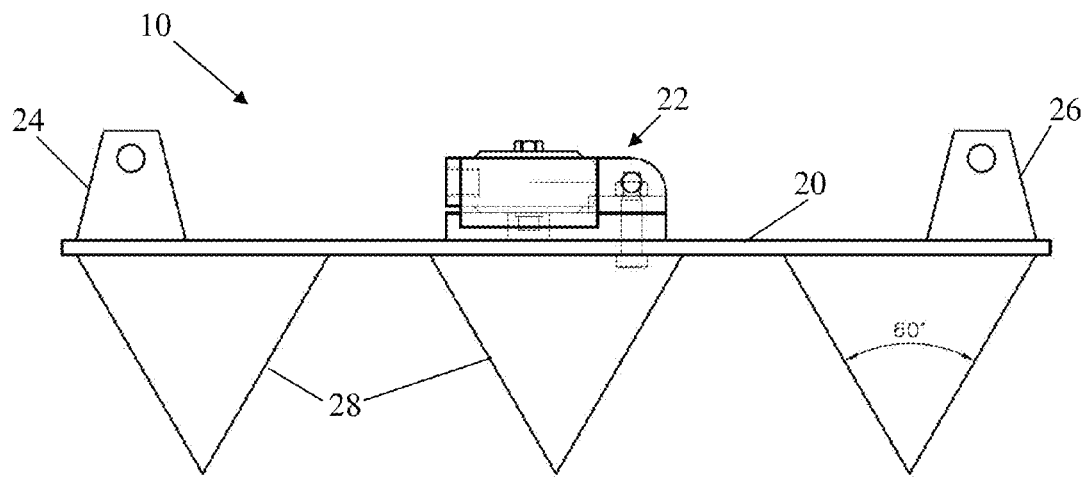
FIG. 1 is a side view illustrating an embodiment of a vibrating device according to the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 61/727,811 filed Nov. 19, 2012 is incorporated in this application by reference.

It should be noted that the overall size of the devices described herein is limited mainly by the opening size of most particulate containers, such as sugar silos. The devices must not only fit in such containers, but also must fit through openings in such containers. However, it will become apparent from the description herein that other device sizes can be used for different applications, such as grain silos and containers of other particulate. Furthermore, all components of the devices described herein are preferably constructed of terrific stainless steel unless otherwise noted, in order that they or any shavings coming from their components can be removed by magnets in a conventional, post-silo process. However, a person of ordinary skill will understand that a different material can be used under different circumstances.

Figure 2:
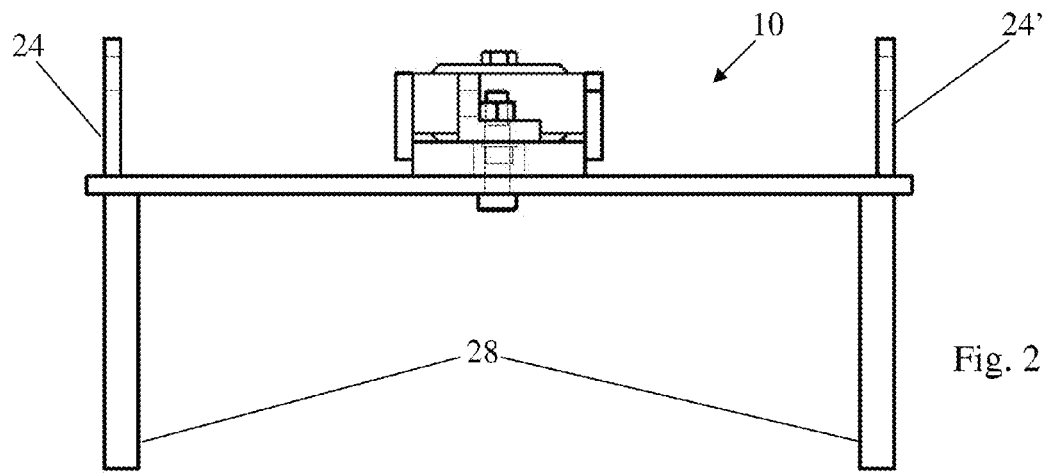
FIG. 2 is an end view illustrating the vibrating device of FIG. 1
Figure 3:
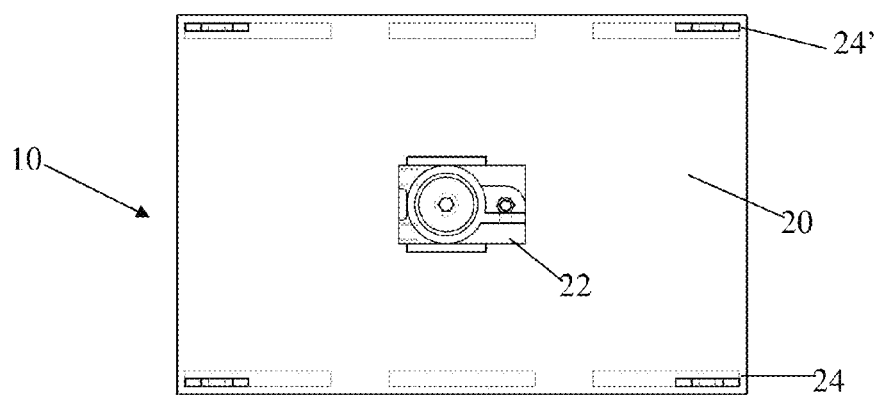
FIG. 3 is a top view illustrating the vibrating device of FIG. 1.
Figure 4:
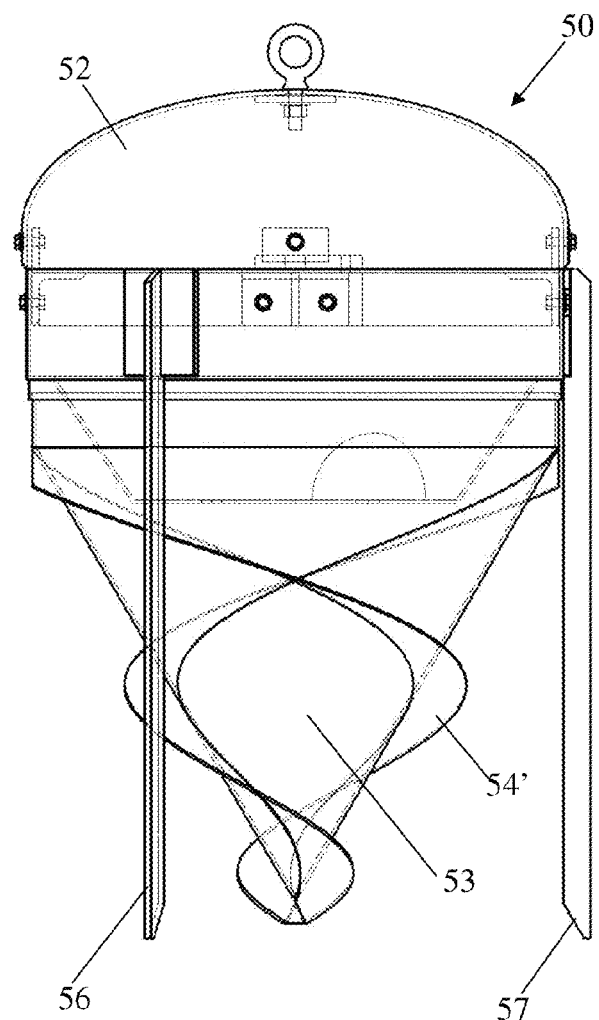
FIG. 4 is a side view illustrating an embodiment of a borer according to the present invention.

A vibrating plate device 10 is illustrated in FIGS. 1-3, and includes a preferably rectangular plate 20 that is about 18 inches long and about 12 inches wide. The plate 20 is preferably about one-half inch thick. Of course, these dimensions can be varied in accordance with conventional principles of engineering compromise. An air vibrator 22, which can be an eccentric air motor, is rigidly mounted to the top surface of the plate 20 in order to, upon actuation, impart vibratory movement to the plate 20 and all structures rigidly attached thereto.

The vibratory movement of the air vibrator 22, and the movement of all vibration mechanisms described herein, is preferably at a frequency closely approximating the natural frequency of the particulate with which the device 10 is designed to be used in order to impart maximum breaking apart of aggregated particulate. For particulate sugar, this frequency may be about 50 to 60 hertz, and, specifically, may be 54 hertz. A different vibrating motor can be used that operates at a lower frequency, for example about 40 hertz, as long as the energy imparted to the particulate is sufficient to disaggregate the particulate. For example, a high amplitude but low frequency vibrating motor can operate better than a lower amplitude but higher frequency vibrating motor.

In a manner similar to how all other vibration mechanisms described herein are propelled to vibrate, two air hoses (not shown) extend separately to the air vibrator 22 from a conventional compressor (not shown) that is disposed outside of a silo (not shown) in which the particulate is contained. The compressor ensures a supply of pressurized air to the air vibrator 22 in order to supply the required motive force to the air vibrator 22, which is a conventional pneumatic vibrating mechanism, such as an eccentric on a rotary pneumatic motor. A return line is preferred in order to prevent the contamination of the environment in which the device 10 is used, such as a food processing facility, by the pressurized air, which could contain oils, oil vapors and other substances that are undesirable when released into the environment in which the device 10 is used, such as a sugar silo. It should be noted that any vibrational energy creating mechanism can be used instead of the preferred pneumatic air vibrator, including any conventional vibratory mechanism.

Lifting lugs 24, 24', 26 and 26' are rigidly mounted to the top of the plate 20 to allow the device 10 to be raised and lowered using cables, chains or any other flexible, rope-like structure. Typically, the device 10 is disposed in the upper region of a container of aggregated particulate by cables that extend downwardly from a conventional crane or other raising or lowering device to hooks or other fasteners that fasten to the lugs.

Multiple "teeth", which are triangular, rigid panels with pointed tips at their lower ends, are mounted to the bottom of the panel 20. Preferably six, but as few as two and as many as eight or more, such teeth 28 may be gusseted where preferably welded to the bottom surface of the plate 20. The teeth 28 are preferably parallel to one another, are preferably about four to six inches tall, and come to a sharp point at their lower tips. This construction encourages the device 10, which can weigh in the range of thirty to fifty pounds, to penetrate a hard layer of aggregated particulate, such as sugar. Of course, if the device 10 is made larger than that described above, it will weigh significantly more, as the person of ordinary skill will understand from this description.

During use, the device's 10 downwardly-directed weight is concentrated on the particulate bridge at the points of the teeth 28. When the air vibrator 22 is activated, the vibrations transmitted to the teeth 28 tend to break up (disaggregate) the aggregated particulate in an area around the contact points of the teeth 28 with the particulate, because the vibrating teeth tend to break up cohering particles due to the vibrational energy transmitted to the particles (the force is greater than the cohesive forces holding the particulate together as an aggregate) and the abrasion of the sharp teeth against the aggregate. This breaking up of aggregate creates regions of loosened particulate around the tips of the teeth. The weight of the device drives the teeth downwardly as the particles disaggregate and can no longer support the weight of the device 10, causing further disaggregation in deeper regions of the particulate layer. In this manner, the teeth "dig" into the aggregated layer by disaggregating the particulate beneath the teeth. The longer the device 10 is vibrated, the farther the teeth 28 penetrate into the layer of aggregated particulate. The vibration is continued until the device 10 either solves the bridging problem by breaking completely through the layer of aggregated particulate, or until a sufficient layer of loosened particulate is created for the second disaggregation device described below to dig deeper.

The second disaggregation device is a vibrating borer 50 that can also be used in the process of disaggregating and penetrating an aggregated particulate bridge. The borer 50, which is illustrated in FIGS. 4-8, is typically used after the device 10 described above, because the device 10 prepares the top surface of the aggregate for the borer 50, but this is not required. The preparation by the plate device 10 forms a layer of disaggregated particulate upon which the borer 50 is placed, and this layer of particulate aids the borer 50 in a way that will become apparent from the description below related to operation of the borer 50.

In general, the borer 50 includes a housing 52 and legs 56, 57 and 58 that remain substantially stationary relative to the aggregated particulate the borer 50 is intended to bore into and break up. A rotatable cone 53 combines with rigidly attached external flights 54' to form an auger 54 that is driven rotatably relative to the housing 52 and the legs 56-58. The auger 54 is "drilled" down into the aggregated particulate, a vibratory motor causes the entire borer 50 to vibrate, and aggregated particulate is thereby disaggregated. Further "drilling" is possible, if needed, as is further vibrating, until a breakthrough occurs that allows the particulate to flow.

Figure 6:
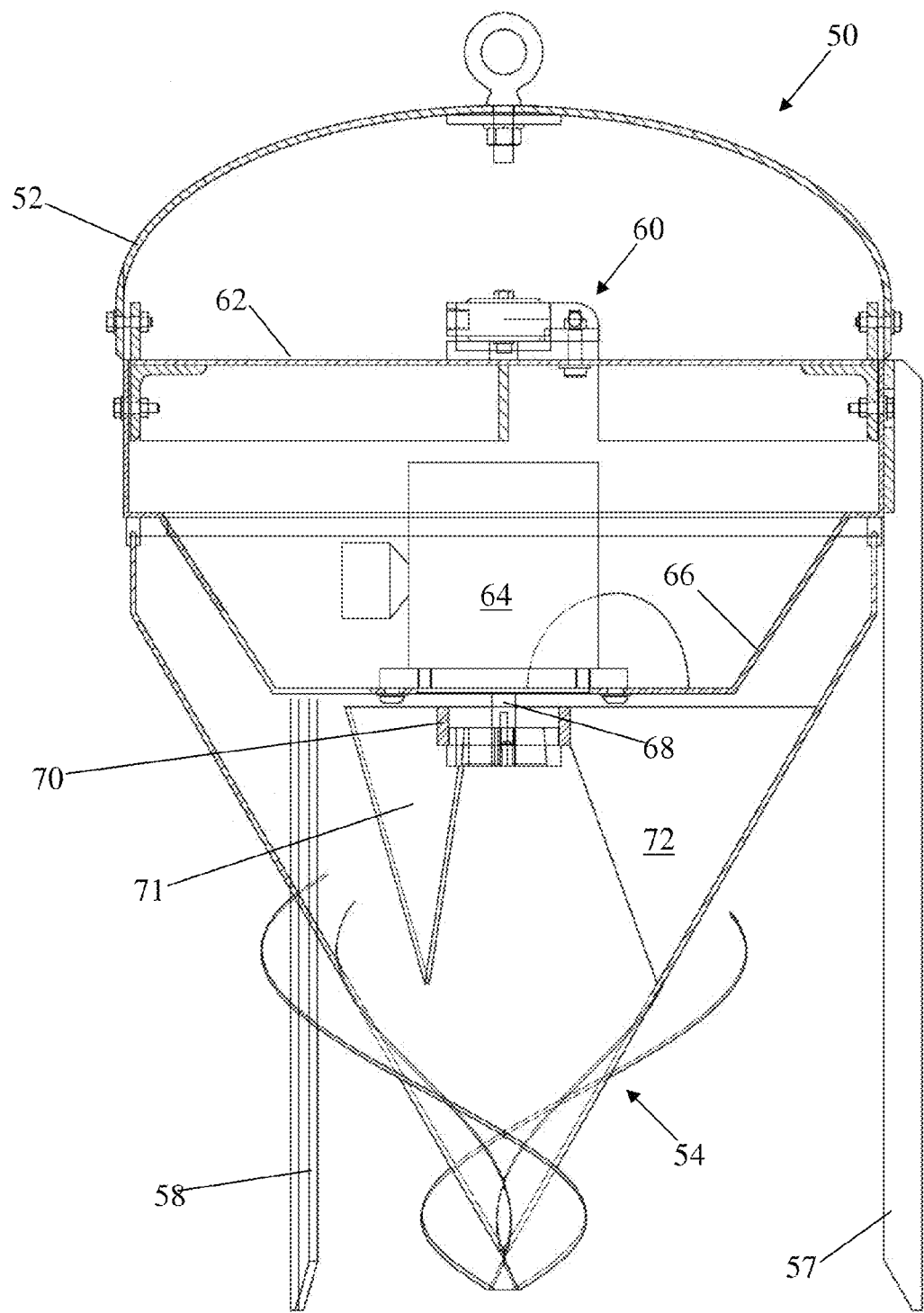
FIG. 6 is a side view in section illustrating an embodiment of the borer of FIG. 4.
Figure 7:
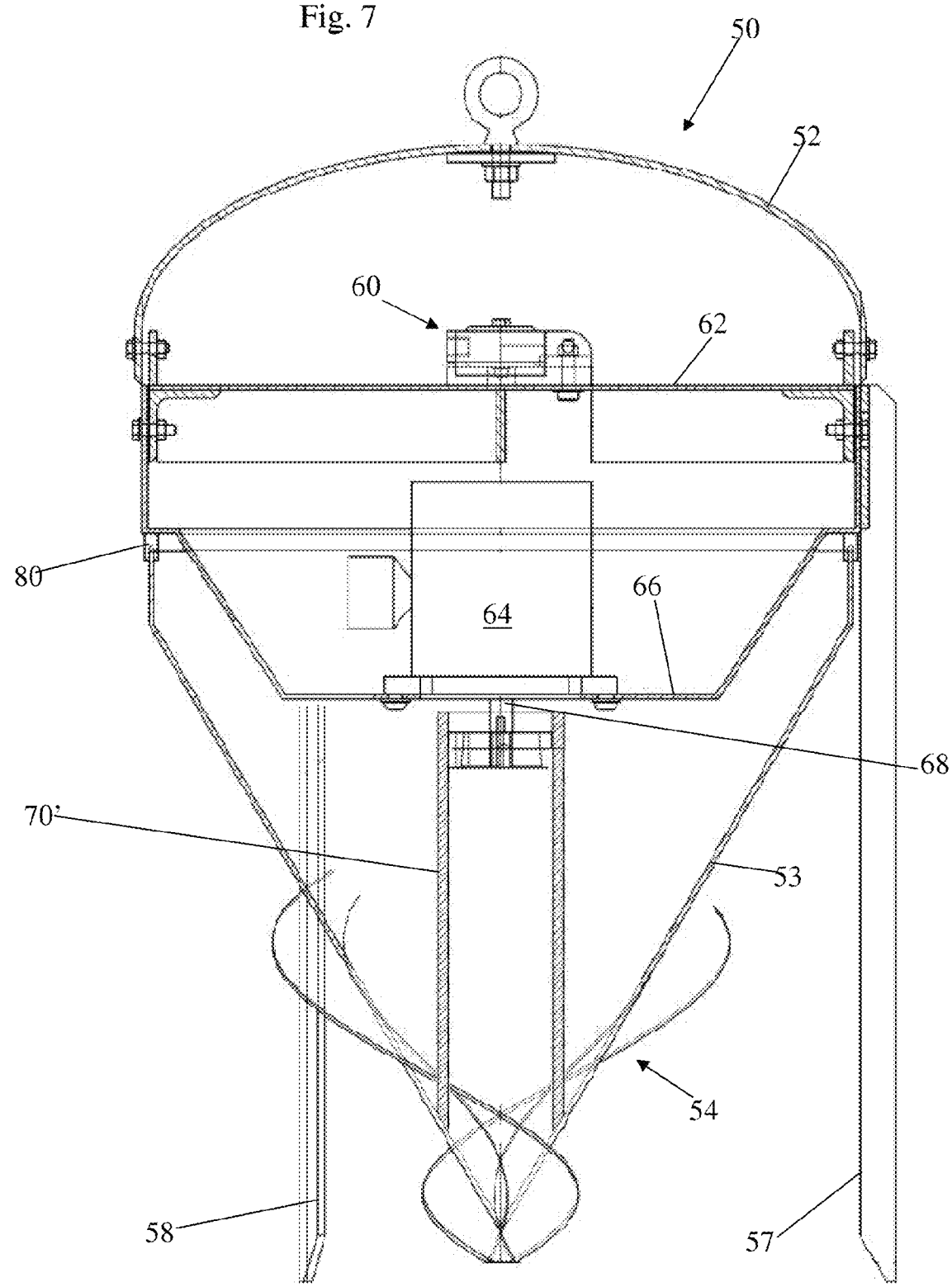
FIG. 7 is a side view in section illustrating another embodiment of the borer of FIG. 4.

In more detail and as shown in section in FIGS. 6-7, a conventional air vibrator 60 is rigidly mounted to the vibrator base 62 of the housing 52, and connects to a pair of supply and return compressed air lines 180 and 182 (FIG. 8), one of which supplies and one of which returns the compressed air to a compressor (not shown) that is preferably outside of the container of the particulate. The air vibrator 60 functions as described above for the device 10, inasmuch as the air vibrator 60 transmits vibrational energy to structures to which the air vibrator 60 is rigidly attached, including at least the housing 52, the auger 54 and the legs 56-58. Thus, upon actuation, the air vibrator 60 works in a conventional fashion to cause the entire borer 50 to vibrate rapidly, preferably in a range of about 50-60 hertz, and more preferably at about 54 hertz. Of course, the frequency can be varied based upon knowledge of vibration and mechanisms for creating vibration.

A rotary motor, such as the pneumatic motor 64, is rigidly mounted to the motor base 66 of the housing 52, and the motor's 64 rotatable driveshaft 68 is rigidly and removably mounted to the cone 53 on which the auger flights 54' are mounted. The motor 64 is preferably connected to the same pneumatic source as the air vibrator 60 by a pair of supply and return compressed air lines 184 and 186 (FIG. 8), one of which supplies and one of which returns the compressed air to the compressor. In the embodiment of FIG. 6, the driving link between the driveshaft 68 and the cone 53 is a plurality of webs 71 and 72 that are rigidly fastened to the collar 70 to which the driveshaft 68 is removably (although rigidly) fastened, such as by a spline shaft, hex shaft, taper lock weld-on hub, or equivalent. The webs 71 and 72 are welded, bolted or otherwise fastened rigidly to the cone 53. In the embodiment of FIG. 7, the webs are not used, but the collar 70' extends from the driveshaft 68 to the cone 53 where a weld, bolt or other rigid attachment is made. Thus, in both the FIG. 6 and the FIG. 7 embodiments, upon actuation of the motor 64, the auger 54 is rotated in the direction that causes the flights to abrade particulate and impel the loosened particulate away from the tip of the cone 54. In this regard, the auger 54 functions in the manner of a "drill bit" that abrades at its tip and impels the abraded particulate away from the tip. Of course, it is possible to reverse the direction for any reason, including but not limited to because the auger is lodged in the aggregate and needs to be removed.

A seal 80 is formed between the auger 53 and the housing 52 to prevent or reduce the penetration of particulate through the gap therebetween into the housing 52. In a preferred embodiment, the seal 80 is augmented by one or more linear or sliding bearings between the widest portion of the auger's cone 53 and the housing 52 to stabilize the rotating auger 54 on the housing 52. Thus, the seal 80 effectively prevents, or mitigates to the extent necessary to retain normal operation, the penetration of particulate into the housing 52, while also balancing the borer 50 during high speed rotation. The top of the housing 52 is a point of attachment for a lifting lug 59 and the point of entry for two air inlets and two air vent hoses (see FIG. 8).

Figure 5:
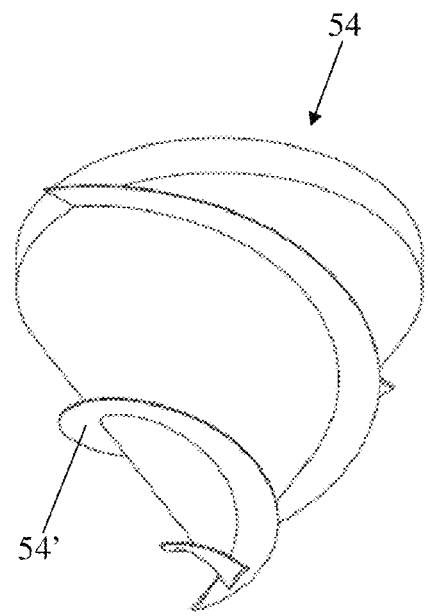
FIG. 5 is a view in perspective illustrating the auger of the borer of FIG. 4.

As shown in FIG. 5 in some detail, the auger 54 has two flights 54' rigidly attached to the exterior surface of the cone 53 that extend helically around the cone's 53 exterior from near the top end of the cone 53 to slightly below the sharp point of the cone's opposite, lower end. As described above, the cone 53 is rotated by the air motor 64 to cause the flights 54' to abrade the aggregated particulate beneath the auger's tip. The flights 54' first abrade the aggregated particulate at the auger's tip, while at the same time the flights 54' impel disaggregated particulate out of the hole that is being formed by the auger in much the same way a drill bit removes particulate formed from the hole it is forming. Rotation of the auger 54 simultaneously drives the auger 54 into the aggregated particulate due to the direction of rotation and the orientation of the flights 54'. The flights 54' are generally helical and during rotation of the auger 54, the force of the helical flights against the aggregated particulate draws the auger 54 into the hole in the manner of a drill bit. Thus, the tip of the flights 54' abrade, while the flights 54' along the side impel particulate out of the hole formed and also frictionally engage the sidewalls of the hole formed to urge the auger 54 further and further into the aggregate.

One or more, and preferably three, legs 56-58 extend downwardly from the housing substantially parallel to the axis of rotation of the auger 54 and substantially parallel to one another. The legs 56-58 are preferably evenly spaced around the housing 52 and are pointed at their distal tips to better penetrate into hardened particulate and to focus the vibrational energy transmitted to them by the vibratory motor 60 to small points where the legs 56-58 contact the aggregated particulate. It is contemplated to use legs that extend more radially outwardly from the housing, but have a lower edge that extends downwardly in the direction the legs 56-58 extend, thereby creating a component of the legs that extends in the same direction as the auger 54. This will also suffice, but has some disadvantage, such as having a larger diameter than the borer 50.

It will be noticed that the legs 56-58 are shaped to move relatively easily lengthwise through the particulate material, such as during initial insertion and then as aggregated particulate is loosened. The legs are also wide to resist rotation of the housing 52 when the housing 52 is surrounded by particulate. In this regard, the legs have an "oar effect", which causes them to resist movement of a fluent material around them laterally in the manner of a boat oar, but due to their thin profile there is little resistance to movement along the length of the legs. This allows the legs 56-58 to slip through particulate along their length, but to substantially resist rotational movement of the legs and housing 52 relative to the particulate.

The legs 56-58 also aid in the transmission of vibrational energy, generated by the vibratory motor, to the particulate. The legs 56-58 thus transmit vibrational energy imparted to them from the housing 52, to which the legs 56-58 are rigidly mounted. In a preferred embodiment, the legs are shaped in the manner of strips, but with sufficient thickness and width to transmit vibrations into the surrounding particulate. Of course, although the legs 56-58 are shown having the same widths along their lengths, the legs can have wider lower ends, as shown by the legs 156, 157 and 158 attached to the borer 150 in FIG. 8. The legs 156-158 have an even greater "oar effect" due to their greater width.

The anticipated maximum diameter of the borer 50 that will be used in a sugar silo is about 22 inches and its maximum height is about 32 inches long, due to the size constraints of a typical sugar silo and the opening thereto. However, these dimensions can be changed to suit the conditions, as will be apparent to the person of ordinary skill from the present disclosure.

The cone 53 is preferably mounted to the driveshaft 68 of the rotary motor 64, and needs to be removable for service. One contemplated embodiment includes the cone being mounted by screws whose heads are exterior to the cone, that screw into the webs 71 and 72 that are, in turn, mounted to the collar 70 that is fixed to the driveshaft 68 using a conventional taper lock apparatus. Thus, one can remove the cone 53 from the webs 71 and 72 by externally accessible fasteners. Alternatively, an access port 160, shown in FIG. 8, can be formed in the cone and covered by a closure (not shown) using fasteners that can be removed from the exterior of the auger 54. The driveshaft 68 can then be disconnected from the cone 53 by accessing the interior of the cone 53.

Figure 9:
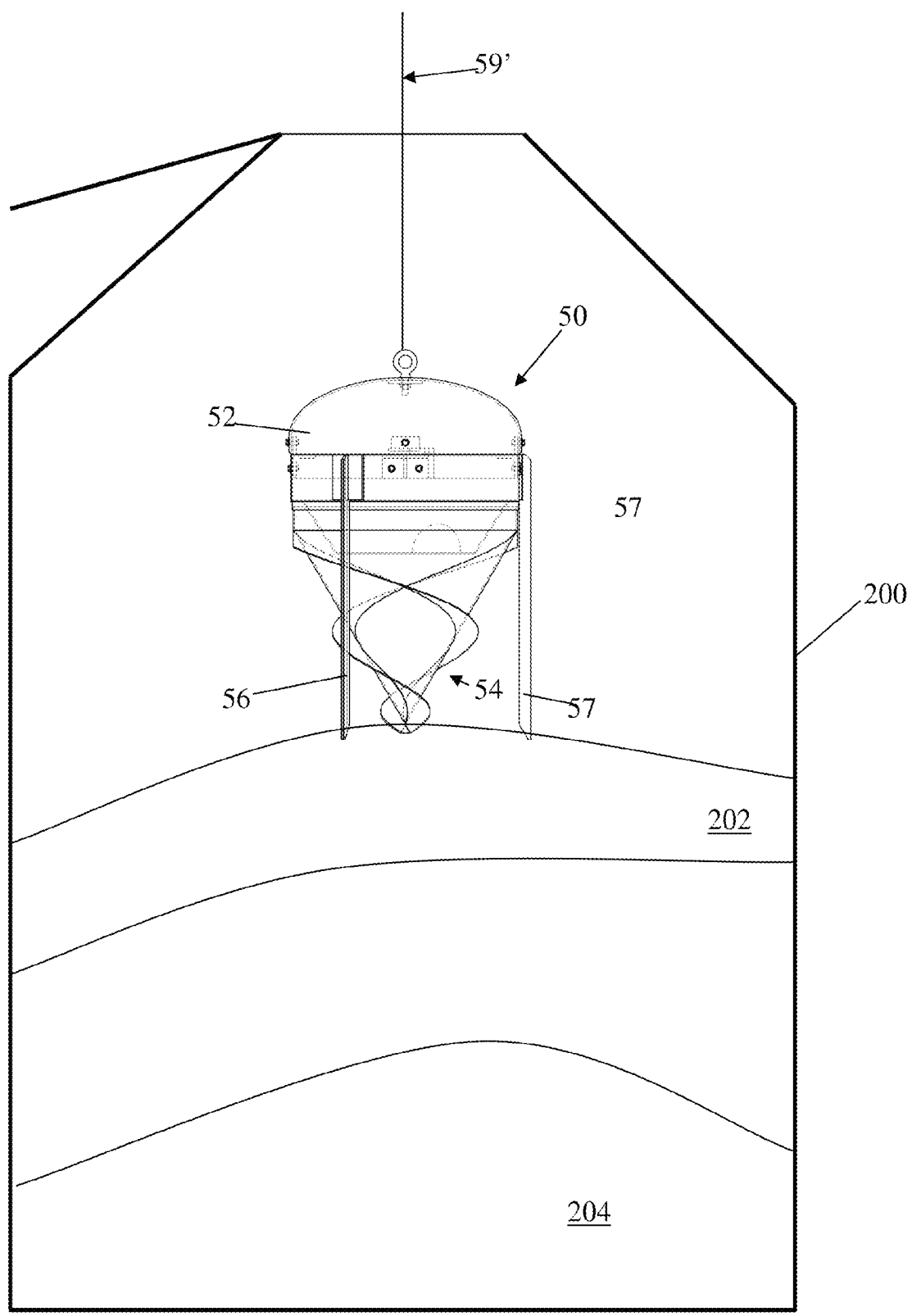
FIG. 9 is a schematic illustration of the borer of FIG. 4 in a silo on top of a layer of aggregated particulate.
Figure 10:
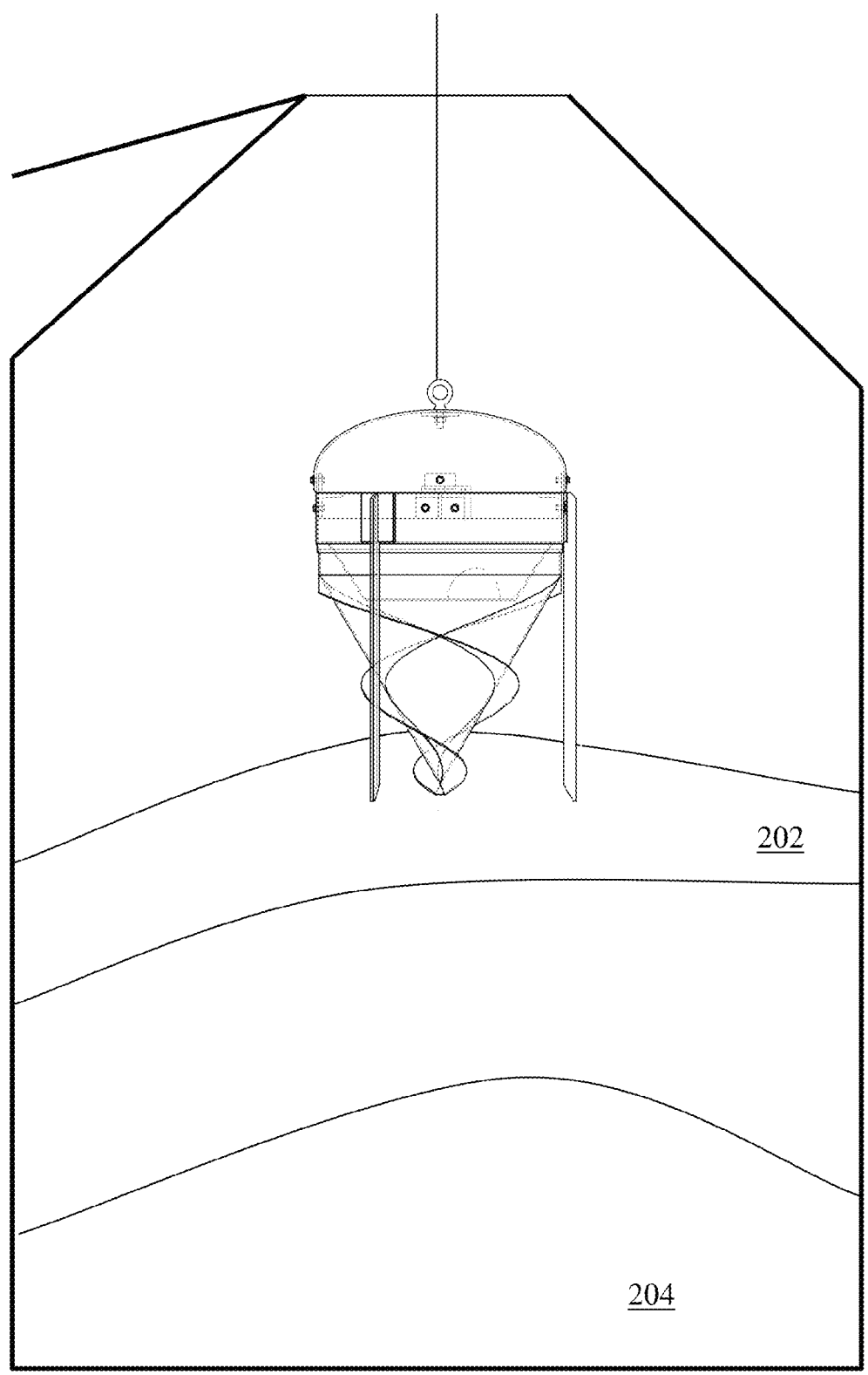
FIG. 10 is a schematic illustration of the borer of FIG. 4 in a silo partially through a layer of aggregated particulate.

It will be understood from the description herein and the schematic illustrations of FIGS. 9-12 that as the borer 50 is lowered into a container 200 by a cable 59' and first contacts the aggregated particulate 202, or extends through a layer of particulate that was prepared by the device 10, the legs 56-58 rest the weight of the borer 50 upon the top surface of the aggregated particulate 202 as shown in FIG. 9. The auger and vibratory motor are controlled using a conventional series of pneumatic switches to turn each pneumatic mechanism on and off, and these switches are accessible from outside the container of particulate. The auger 54 is thereby rotated, and the legs 56-58 resist rotation of the housing 52 relative to the particulate so that the auger 54 penetrates into the aggregated particulate 202 as shown in FIG. 10. The rotational resistance of the legs ensures proper function of the auger 54 in rotating relative to the aggregated particulate 202 and the housing 52 in order to "drill" the borer 50 downwardly.

Once embedded in the aggregated particulate 202, the auger 54 is halted and the vibratory motor 60 is actuated to vibrate the entire borer 50 at a frequency similar to the natural frequency of the particulate as noted above, thereby disaggregating a volume of particulate 202 around all structures of the borer 50. The shape can be approximately spherical, and can be about three feet in diameter. If this disaggregation does not create a hole that penetrates the bottom of the bridge of particulate matter 202, the vibrating is halted and the auger 54 is rotated further to bore the borer 50 deeper into the bridge. Next, the auger 54 is halted and the vibration is resumed. This process continues, for example every eight to twelve inches of boring into the aggregated particulate bridge 202, until one or more holes is formed in the bridge that is large enough to allow the particulate above the aggregated particulate bridge to flow through to an outlet on the bottom of the silo.

Figure 11:
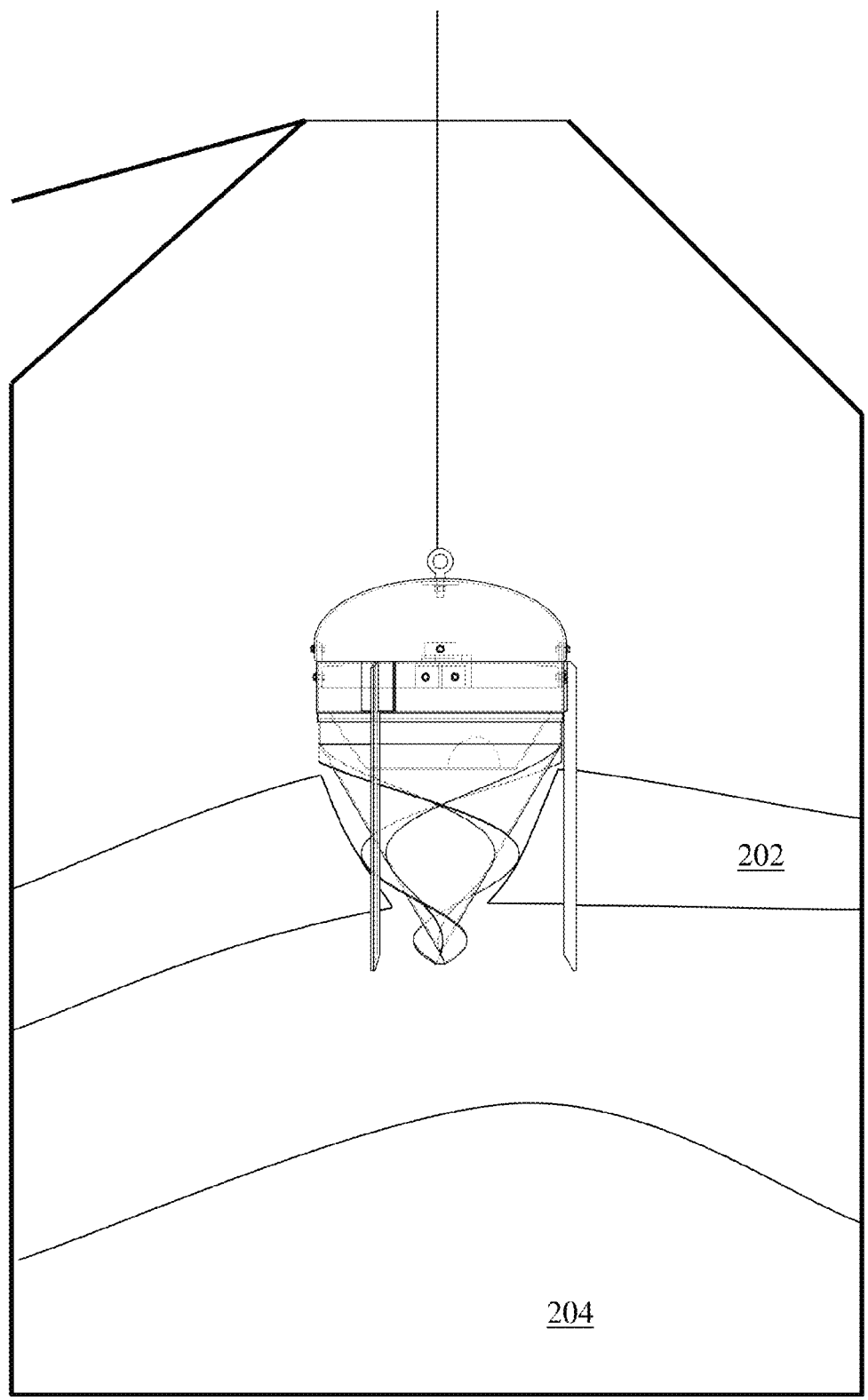
FIG. 11 is a schematic illustration of the borer of FIG. 4 in a silo completely through a layer of aggregated particulate.
Figure 12:
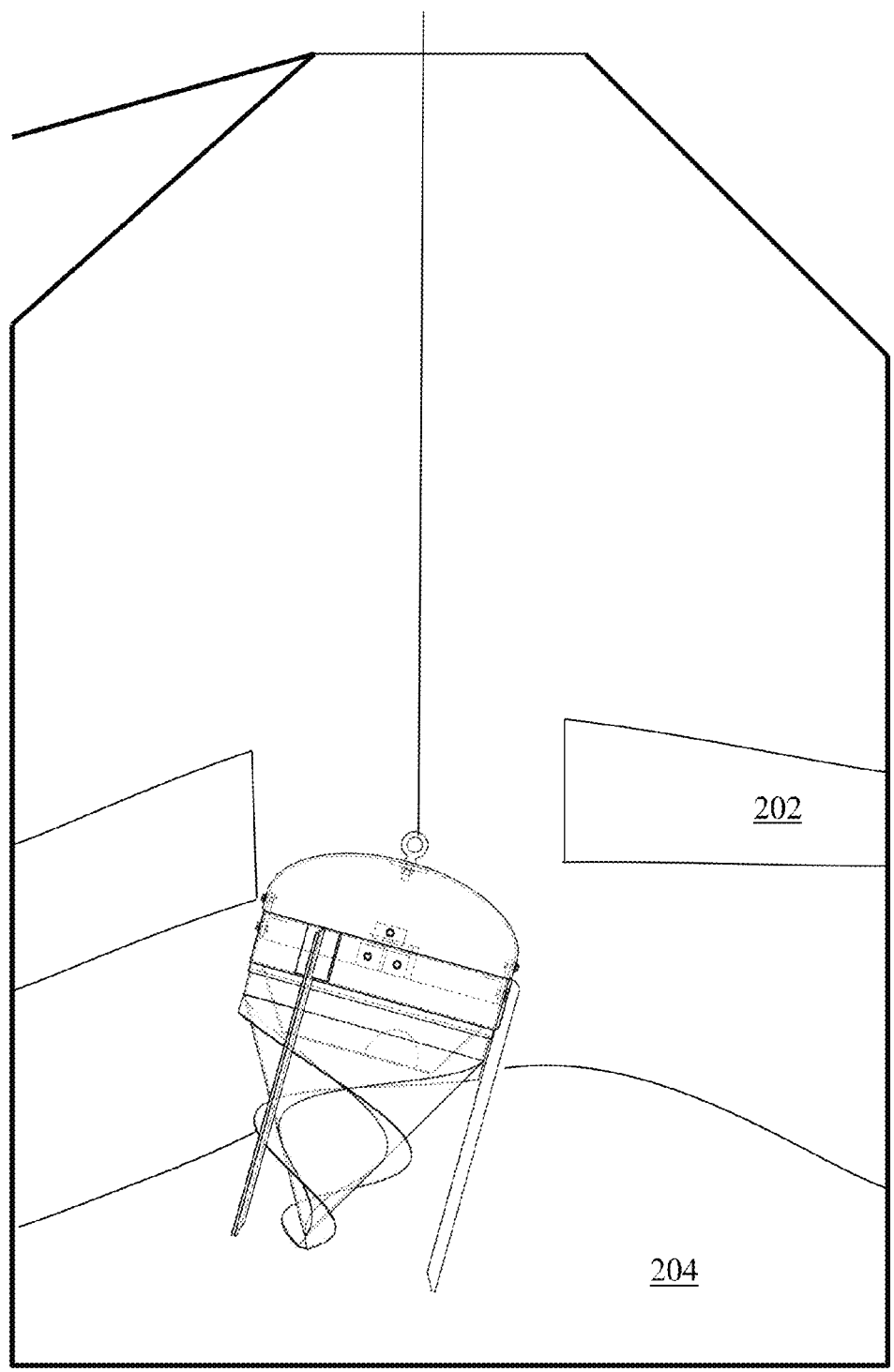
FIG. 12 is a schematic illustration of the borer of FIG. 4 in a silo completely through a layer of aggregated particulate and resting on a pile of disaggregated particulate beneath the layer.

The illustration of FIG. 11 shows a breakthrough of size smaller than the entire borer 50, and the illustration of FIG. 12 shows a breakthrough of size large enough for the entire borer 50 to pass through and rest upon the disaggregated particulate 204 below the aggregated particulate bridge 202. At the end of use, as noted by either the conditions represented in FIG. 11 or FIG. 12, the borer 50 is simply raised through the top of the silo 200 and processing continues. Alternatively, the borer could be raised and then lowered onto a different region of the aggregated particulate 202 that is spaced from the hole that was just formed, and the process can continue until another hole is formed in the aggregated particulate 202 bridge. This could continue as long as desired for as many holes as are desired.

Figure 8:
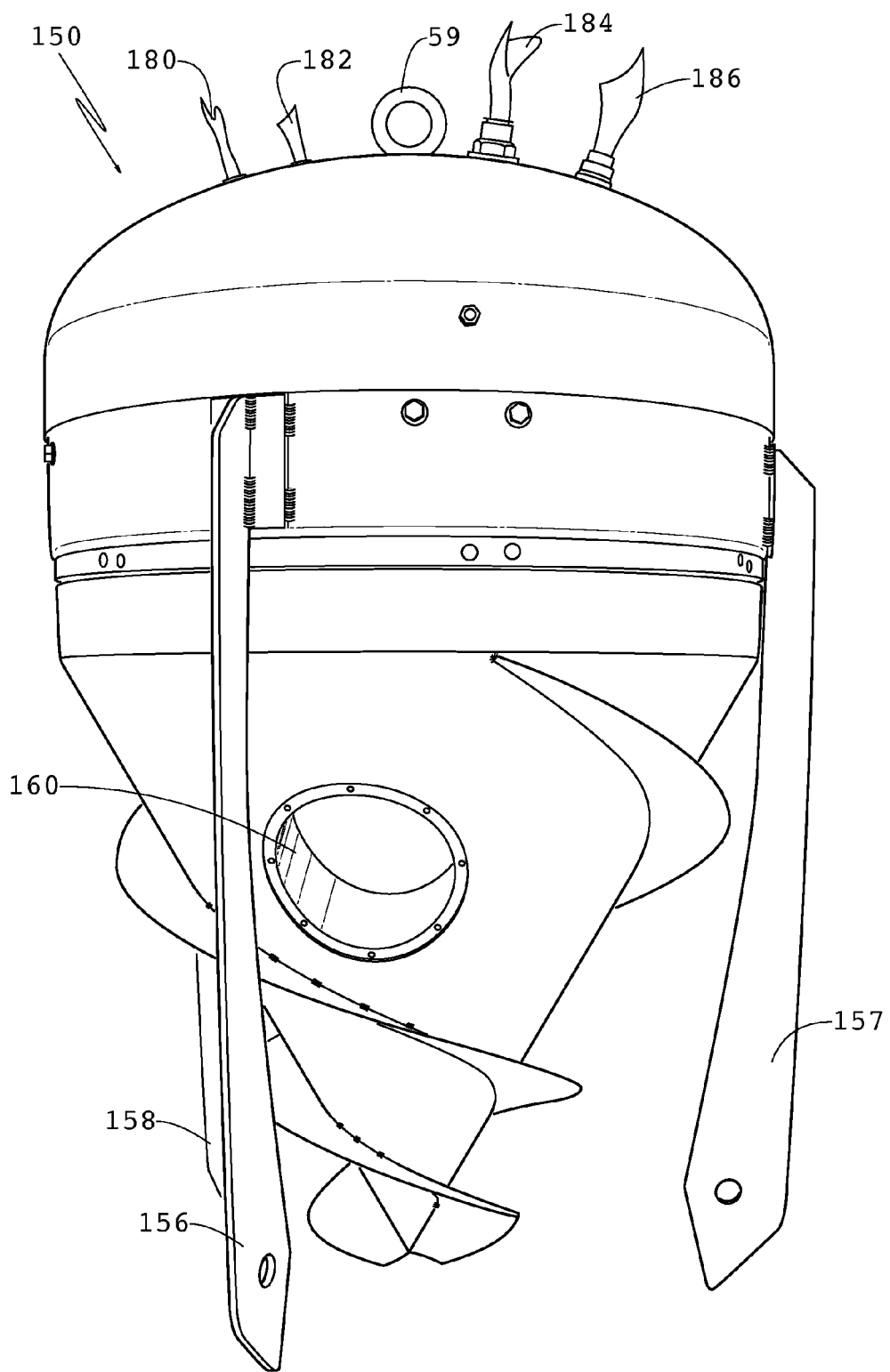
FIG. 8 is a side view illustrating the borer of FIG. 4.

It should be noted that holes 157', 156' and 158' can be formed in the legs 156, 157 and 158, respectively, as shown in FIG. 8. These holes permit the attachment of a wire, cable or other structure so that a downward force can be applied to the borer 150 during use. This downward force mitigates lateral movement of the borer 150 that could cause an impact with the side of the silo and one of the legs. In this process, the wire is attached to the lower end of the silo when empty or at some other time, and then extended upwardly to or near the top of the silo where it is attached. Then, when a bridge of aggregated particulate is formed, the wire extends through the aggregated particulate bridge and can be attached to the borer 50. A tensile force is exerted in a downward direction, which, combined with the upwardly directed force by the crane holding the top of the borer 50, tends to prevent lateral movement of the borer 50 during use.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A boring and disaggregating apparatus comprising:
   (a) a housing to which a vibrating motor is rigidly mounted, and to which a rotational motor is rigidly mounted, the rotational motor having a driveshaft;
   (b) an auger drivingly linked to the motor's driveshaft to rotate relative to the housing, the auger extending from the housing in a first direction; and
   (c) at least one leg extending from the housing, said at least one leg having a component in the first direction.

2. The apparatus in accordance with claim 1, wherein said at least one leg comprises at least three legs, each of said legs being substantially parallel to one another and substantially parallel to an axis of rotation of the auger.

3. The apparatus in accordance with claim 2, wherein the auger is conically shaped and has at least one helical flight thereupon for engaging aggregated particulate and disaggregating the same.

4. A combination boring and disaggregating apparatus to act on an aggregate, the combination comprising:
   (a) a housing to which a vibrating motor is rigidly mounted, and to which a rotational motor is rigidly mounted, the rotational motor having a driveshaft;
   (b) an auger drivingly linked to the motor's driveshaft to rotate relative to the housing, the auger extending from the housing in a first direction and contacting the aggregate at an auger tip; and
   (c) at least one leg extending from the housing, said at least one leg having a component in the first direction and a leg tip contacting the aggregate.

5. The combination in accordance with claim 4, further comprising a second leg and a third leg extending from the housing substantially parallel to the first leg, and each of said second and third legs having a leg tip contacting the aggregate.

6. The combination in accordance with claim 5, wherein the auger contacts the aggregate within a bore formed in the aggregate.

7. The combination in accordance with claim 5, further comprising:
   (a) a rigid plate;
   (b) teeth extending substantially in two substantially parallel rows, each tooth having a tooth base attached to the plate and a tooth tip spaced from the plate that is substantially narrower than the tooth base, and each tooth extending perpendicularly from the plate in contact with the aggregate; and
   (c) a vibratory motor rigidly mounted to the plate.

* * * * *